(12) United States Patent
Kim

(10) Patent No.: US 9,761,130 B2
(45) Date of Patent: Sep. 12, 2017

(54) STANDBY ELECTRIC POWER CUTOFF APPARATUS FOR ELECTRONIC PRODUCT

(71) Applicant: MILPROS CO., LTD., Hwaseong (KR)

(72) Inventor: Chang-Ho Kim, Seoul (KR)

(73) Assignee: MILPROS CO., LTD., Hwaseong, Gyeonggi-do (KR)

(*) Notice: Subject to any disclaimer, the term of this patent is extended or adjusted under 35 U.S.C. 154(b) by 383 days.

(21) Appl. No.: 14/522,715

(22) Filed: Oct. 24, 2014

(65) Prior Publication Data

US 2015/0042178 A1 Feb. 12, 2015

Related U.S. Application Data

(63) Continuation of application No. PCT/KR2013/003578, filed on Apr. 25, 2013.

(30) Foreign Application Priority Data

Apr. 26, 2012 (KR) .................. 10-2012-0043549

(51) Int. Cl.
G08C 23/04 (2006.01)
H02J 3/00 (2006.01)
H02J 9/00 (2006.01)

(52) U.S. Cl.
CPC ............... *G08C 23/04* (2013.01); *H02J 3/00* (2013.01); *H02J 9/005* (2013.01); *Y10T 307/773* (2015.04)

(58) Field of Classification Search
None
See application file for complete search history.

(56) References Cited

U.S. PATENT DOCUMENTS 6,489,725 B1 12/2002 Suzuki et al.
2008/0024074 A1* 1/2008 Mosebrook ........ H05B 37/0209
315/291

(Continued)

FOREIGN PATENT DOCUMENTS

CN 101976107 A 2/2011
CN 201957156 U 8/2011
(Continued)

OTHER PUBLICATIONS

CN Office Action issued Jul. 4, 2016 in the corresponding Chinese Patent Application No. 201380033383.6.

*Primary Examiner* — Jared Fureman
*Assistant Examiner* — Aqeel Bukhari
(74) *Attorney, Agent, or Firm* — Mintz Levin Cohn Ferris Glovsky and Popeo, P.C.; Kongsik Kim; Colleen H. Witherell

(57) ABSTRACT

A standby electric power cutoff apparatus for an electronic product is disclosed. A power supply/cutoff unit (20) of the present invention comprises: a power switch (SW) for manually turning an input of an AC power source of the electronic product on/off; a pair of photo-triacs (21, 22) which are disposed in parallel to each other between input terminals of the AC power source, and which receive power through the power switch (SW); a photo-coupler (23) which is disposed between the power switch (SW) and the input terminals on one side of the AC power source and comprises a light emitting diode (D3) and a transistor (Q1) for receiving a light emitting signal from the light emitting diode; and a relay means which comprises a relay (K1) connected to a control unit (60) having a microcomputer (u-COM), and which supplies or cuts off the AC supply power to a power supply unit (30) by controlling operations for connecting or disconnecting contact points of the relay according to a control state of the control unit (60). In addition, a standby (Continued)

electric power cutoff apparatus for an electronic product (100) which controls functions using a remote controller (300). A power supply/cutoff unit (400), according to the present invention, comprises: IR-receiving triacs (110) which receive IR signals from the remote controller, and which are turned on so as to transfer the AC supply power to a power supply unit (130) when the IR signals are received; and an IR-receiving unit (120) for receiving the IR signals and transferring the received IR signals as control signals to a control unit (160).

11 Claims, 3 Drawing Sheets

(56) References Cited

U.S. PATENT DOCUMENTS

2008/0250171 A1\* 10/2008 Pfingsten ............... H01H 9/542
                                                      710/61
2012/0201062 A1\* 8/2012 Lee ......................... H02J 9/005
                                                      363/84

FOREIGN PATENT DOCUMENTS

| | | |
|---|---|---|
| CN | 102265470 A | 11/2011 |
| KR | 10-2001-0077058 A | 8/2001 |
| KR | 10-0386246 B1 | 6/2003 |
| KR | 10-0387111 B1 | 6/2003 |
| KR | 10-0975642 B1 | 8/2010 |
| KR | 10-2012-0027409 A | 3/2012 |
| WO | WO 2011/002717 A2 | 1/2011 |

\* cited by examiner

STANDBY ELECTRIC POWER CUTOFF APPARATUS FOR ELECTRONIC PRODUCT

CROSS-REFERENCE TO RELATED APPLICATIONS

This application is continuation of International Application No. PCT/KR2013/003578 filed on Apr. 25, 2013, which claims priority to Korean Patent Application No. 10-2012-0043549 filed on Apr. 26, 2012. The applications are incorporated herein by reference.

TECHNICAL FIELD

The present invention relates to a standby electric power cutoff apparatus which cuts off a standby electric power of an electronic product, and more particularly, to a standby electric power cutoff apparatus capable of completely and automatically cutting off a consumption of a standby electric power even though a power plug of a product is not separated from a socket, when a power of an electronic product such as a TV, an air-conditioner and a stereo is turned off manually or using a remote controller.

The present invention also relates to a standby electric power cutoff apparatus of an electronic product, which can turn on a power using a remote controller in a state in which the electronic product is turned off (i.e., a state in which a standby electric power is zero).

BACKGROUND ART

A standby electric power refers to a small amount of power continuously consumed owing to any reason even when an electronic device is not used in a state in which a power plug of the electronic device is generally connected to a socket. Recently, an effective cutoff of such a standby electric power has been raised as one of the most important problems in increasing an energy efficiency of various electronic products.

A laid-open patent publication No. 10-2012-0027409 of Sony, which is one of prior arts for cutting off a standby electric power discloses an electronic device controller which controls a product power with a remote controller using a laser as a light source in a state in which a standby electric power is zero. This includes an energy converter which receives light energy from a laser of the remote controller capable of remotely controlling a television and using the laser to convert the light energy into electric energy. In the above-mentioned patent, since the used laser is a single color and has a single wavelength, the laser beam should be accurately focused to a light source receiving unit (of which light sensing angle is generally narrow) of the electronic product to generate the light energy and to operate the electronic product. Therefore, in order to turn on an electronic product, when the laser beam is not accurately focused, the electronic product is not operated, which is inconvenient. In addition, since power consumption for emitting the laser is considerably large, battery power consumption in the remote controller is comparatively increased, and thus a period in which a user must change a battery is shortened. Furthermore, in order to resolve the difficulty of the focusing of the laser beam when it is used, a laser light source may be added in the remote controller or a laser receiving unit of the electronic device may be disposed in a plurality of positions. However, a manufacturing cost is increased even the above-mentioned problem is completely not resolved.

A registered patent publication No. 10-0975642 which is another prior art discloses a standby electric power cutoff apparatus and a control method thereof. This relates to a standby electric power cutoff apparatus including a control unit which studies power on/off control data transmitted from a remote controller and performs a standby electric power consumption cutoff control of an electronic product under the received on/off control data of the remote controller. Since this technique is a construction for cutting off an output terminal of a socket to which a product is connected by including a separate socket rather than controlling a turning on and off of the electronic product controlled by an IR remote control, using a direct IR signal, a circuit construction is more complex due to an addition of such a device. Therefore, a manufacturing cost is increased and since a study mode should be set in order to recognize a signal of the remote control before using the remote control when the remote control corresponding electronic product is used, it is inconvenient to use.

In addition, when a power of the electronic product is turned off, a standby electric power is cut off, however, a power is supplied to a socket until a super condenser is charged. Although a corresponding electronic product is not used for a long time, when the product is discharged, it should be frequently charged, and thus a standby electric power is still consumed.

Therefore, in the prior art, even when the power of the electronic product is turned off, when a power plug of the product is not separated from the socket, the standby electric power is still generated, and thus a power is unnecessarily wasted. In addition, in a case of an electronic product using an IR remote controller, in order to enable a corresponding IR receiving module to always receive a signal, an operation power should be always supplied to at least the corresponding IR receiving module, and thus a standby electric power is wasted more than that of a normal product.

SUMMARY

Therefore, the present invention has been made in order to enhance the above-mentioned problems of the prior art. The present invention is to provide a standby electric power cutoff apparatus and a control method thereof capable of turning on/off a power using one switch mainly used as a power 'on/off' switch of an existing electronic product, and capable of controlling the power of the product to an 'on' state using a remote controller even without a separate power supply to an IR receiving module of the remote controller in a state in which a standby electric power is completely cut off in the electronic product.

In accordance with an aspect of the present invention, there is provided a standby electric power cutoff apparatus of an electronic product. The standby electric power cutoff apparatus includes a power unit that generates and supplies operation power necessary in an operation of the electronic product from an AC supply power, a control unit including a microcomputer (u-COM) performing general functions of a monitoring for a satisfaction-or-not of an operation state of the electronic product and predetermined control conditions, an operation, an analysis and a control, and a power supply/cutoff unit that receives the AC supply power and supplies or cuts off the AC supply power to the power unit of the electronic product under a control of the control unit, wherein the power supply/cutoff unit comprises:

a power switch that manually turns an AC power of the electronic product on/off;

a pair of photo-triacs that pass through the power switch between input terminals of the AC power and disposed in parallel, wherein each photo-triac includes at least one light emitting diode of which one terminal is connected from the power switch and a triac connected so that operates by receiving a light emitting signal from the diode;

a photo-coupler disposed between the power switch and one side input terminals of the AC power, and including at least one light emitting diode and a transistor that is formed to receive a light emitting signal from the light emitting diode; and a relay means that includes a relay connected to the control unit, and supplies or cuts off the AC supply power to the power unit by driving the relay according to a control state of the control unit to connect or disconnect contact points of the relay.

Preferably, the microcomputer (u-COM) of the control unit is a microprocessor.

Preferably, a current limiting resistor (R1) serially connected between an input terminal of the AC supply power and the photo-triacs and a diode are included.

The relay means may include a transistor of which a base is connected to an output terminal ($O_1$) of the control unit and a relay directly connected to the transistor, drives the relay to an energized/de-energized state under a control of the microcomputer to drive the contact points to the connected or the disconnected state.

Selectively, the power switch (SW) includes at least one tact switch.

In accordance with a second aspect of the present invention, there is provided a standby electric power cutoff apparatus of an electronic product controlled by a remote control (300). The power supply/cutoff unit comprises:

at least one IR receiving triac that receives an IR signal from the remote control, and when the IR signal is received, turns on to transfer the AC supply power to the power unit;

an IR receiving unit that receives the IR signal and transfers the IR signal to the control unit as a control signal; and a relay means that includes at least one relay connected to an output ($O_2$) of the control unit, and supplies or cuts off the AC supply power to the power unit by driving the relay according to a control state of the control unit to connect or disconnect contact points of the relay.

Preferably, the power supply/cutoff unit is formed so that the AC power is supplied to the power unit, when the IR receiving triac is turned on and the AC power is supplied to the power unit, the power unit generates and supplies a power necessary for the electronic product to supply the operation power to the control unit, and when the operation power is supplied, the control unit sets the relay to an energized state through an output ($O_2$) to connect the contact points of the relay (K2) so that the AC power is supplied to the power unit.

Selectively, the IR receiving triac is formed with a preamp terminal including at least one triac operated by a low current, and is formed so that when the triac is turned on, a next connected triac oscillates, and a main triac is turned on to flow a large current.

A standby electric power cutoff apparatus of an electronic product according to the present invention uses an existing IR remote controller, and therefore, if an IR receiving unit of a product is not blocked by other things, even if the IR remote controller shoots an IR signal to a wall, the product may be operated by a reflected IR signal. Thus, since a sensing angle is wide, the product is easily operated without focusing. Therefore, it is convenient and only one receiving unit is necessary, and thus a manufacturing cost can be reduced.

In addition, the present invention completely cuts off a standby electric power of a product when a power of the electronic product is turned off. Therefore, a standby electric power which was wasted in the prior art is eliminated, energy can be reduced, and $CO_2$ generated in a case of a generating of a standby electric power can be reduced, and thus there is an effect of preventing an environment pollution.

In addition, in a case of a product operated by an IR remote controller, a power is always supplied to an IR receiving module to receive an infrared signal and a power is consumed, however, even if a power is not supplied to the IR receiving module, the IR receiving module receives the infrared signal to operate, and thus there is an effect of reducing a consumed power.

DETAILED DESCRIPTION

Hereinafter, a preferable embodiment of a standby electric power cutoff apparatus of an electronic product according to the present invention will be described in detail with reference to accompanying drawings. In the description for an embodiment to be described later, specific construction elements such as a power unit, a control unit, an input unit, a display unit, a load, a photo-triac, a photo-couple, a power switch, an IR receiving module and a power supply/cutoff unit are named. All of these are provided to help an overall understanding for the present invention, but the present invention is not limited thereto. It should be understood that such specific details may be modified or changed using elements having similar functions, without departing from a scope and a spirit of an invention defined by patent claims to be described later, by a person having a common knowledge in a concerned technical field.

Hereinafter, a standby electric power cutoff apparatus of an electronic product and an operation method thereof according to the present invention will be described in detail with reference to the accompanying drawings.

Figure 1:
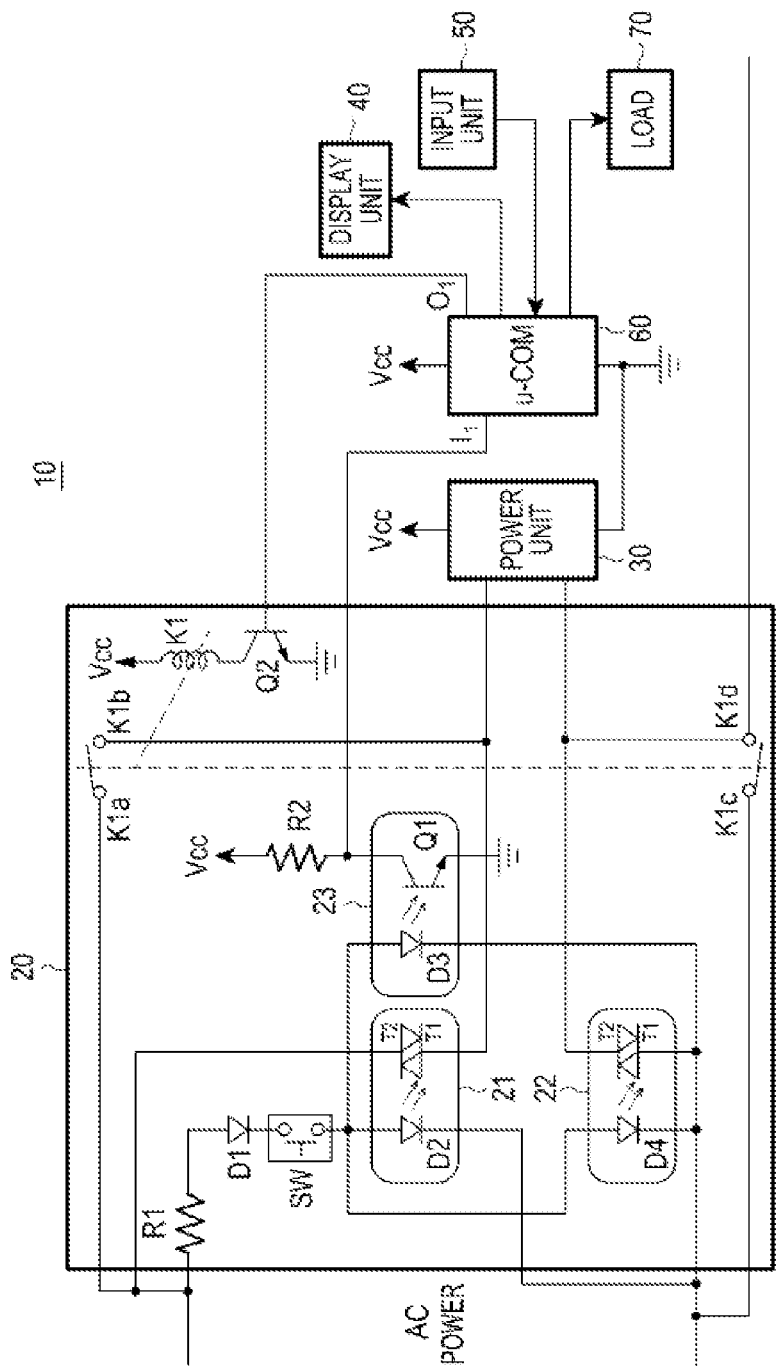
FIG. 1 illustrates a circuit diagram of a standby electric power cutoff apparatus of an electronic product according to an embodiment of the present invention.

FIG. 1 illustrates a circuit diagram of a standby electric power cutoff apparatus of an electronic product according to an embodiment of the present invention. A reference numeral 10 in the drawing shows an electronic product such as a television including a standby electric power cutoff apparatus of the present invention or a schematic construction of a part including a power unit 30 thereof. A power supply/cutoff unit 20 to which an AC power is input supplies or cuts off the AC power to the power unit 30 of the electronic product under a control of a microcomputer 60. The microcomputer 60 includes a microprocessor (u-COM) for controlling overall operations of the standby electric power cutoff apparatus 10 according to the present invention. The microprocessor may be implemented using, for example, a low power microcomputer of Texas Instruments. As shown in FIG. 1, a power switch SW for manually turning on/off a power of the electronic product 10 is formed to be connected between an input terminal of the AC power and at least one, preferably, of a pair of photo-triacs 21 and 22 which are constructed in parallel, through a current limiting resistor R1 and a diode D1. The power switch SW may be formed with a tact switch. The resistor R1 plays a role of enabling the power switch SW not to be forced by decreasing an input voltage through the resistor R1 and a diode D1. Each of the photo-triacs 21 and 22 is connected between an AC main power and the power unit 30 of the electronic product. When a user pushes the switch SW manually, a current flows to an LED D3 of a photo-coupler 23 and LEDs D2 and D4 of the photo-triacs 21 and 22, and the LEDs are lighted, the photo-triacs 21 and 22 are turned on, and the AC power is supplied to the power unit 30. At this time, the power unit 30 generates a power necessary for the electronic product, and supplies an operation power to the microcomputer 60 and each circuit unit, for example, a display unit 40, an input unit 50, a load 70 and the like of the electronic product. When the microcomputer 60 is operated by the application of the above-mentioned operation power, a high signal is supplied to an output terminal $O_1$ thereof and a transistor Q2 is turned on, a relay K1 connected to the output terminal $O_1$ of the microcomputer is driven to an energized state, contact points K1a/K1b and K1c/K1d are connected, and the power supply/cutoff unit 20 is constructed so that the AC power is continuously supplied to the power unit 30 through these relays.

Meanwhile, when the manual power switch SW is pushed one more time in order to turn off the AC power, since a current flows to the LED D3 of the photo-coupler 23 and the transistor Q1 turns on, the power supply/cutoff unit 20 according to the present invention is constructed so that an input $I_1$ of the microcomputer 60 is set to a low state and the microcomputer 60 senses a power 'off' signal.

Here, the power unit 30 which generates and supplies the operation power necessary in an operation of the electronic product from the AC power, the microcomputer control unit 60 which performs general functions of sensing a satisfaction-or-not of a state of the electronic product and control conditions, an operation, an analysis and a control, the display unit 40 which displays information according to the operation of the electronic product to an outside thereof, the input unit 50 which inputs data to the electronic product and corrects the data, and the load 70 generated according to a predetermined operation of the electronic product are common elements which are normally included or commonly included in an electronic product, and detailed descriptions about these elements will be omitted here for convenience.

Hereinafter, an operation of the standby electric power cutoff apparatus according to the construction in FIG. 1 of the present invention will be described in detail. In FIG. 1, when the power switch SW is pushed once in a state in which a power of the electronic product 10 is turned off, the AC power (e.g., 220 V or 100 V) is divided, a current is limited, the current flows through the diode D1 only in a case of a forward direction, a voltage is applied to the LEDs D2 and D4 of the photo-triacs 21 and 22, the current flows to the LEDs D2 and D4, and the LEDs are lit. Then, T1 and T2 of the photo-triacs 21 and 22 turn on, the AC power is supplied to the power unit 30, and thus the power unit 30 generates and supplies the power necessary for the electronic product. At this time, although a current is also flowed to the LED D3 of the photo-coupler 23 and the LED D3 is lit, since a power voltage Vcc is not still applied to the transistor Q1, the transistor Q1 is not operated.

Next, a power is supplied to the control unit 60 from the power unit 30, the microcomputer 60 controls the output $O_1$ to be in a 'high' state, and a transistor Q2 of the power supply/cutoff unit 20 turns on. Therefore, a current flows to a coil of the relay K1, the relay K1 becomes an energized state, and the contact points K1a/K1b and K1c/K1d of the relay are connected. When the power switch SW is disconnected and opened, the current flowing to the LEDs D2 and D4 is shut off. At this time, since the LEDs D2 and D4 are turned off, when the T1 and T2 of the photo-triacs 21 and 22 are turned off, the AC power provided to the power unit 60 through the photo-triacs 21 and 22 is cut off. However, since the AC power is continuously supplied through the relay contact points K1a/K1b and K1c/K1d, the electronic product is normally operated.

If, when the power switch SW is pushed again in order to turn off the electronic product 10, like a case in which a power is turned on (i.e., power 'on') as described above, the LEDs D2 and D4 of the photo-triacs 21 and 22 are lit, the triacs T1 and T2 are turned on, and the power is supplied to the power unit 60. However, since a power having the same phase is already supplied through the relay contact point, there is no effect in an operation.

Meanwhile, the LED D3 of the photo-coupler 23 connected to the power switch SW in parallel is lit, the transistor Q1 turns on, a current flows to a resistor R2, the microcomputer detects a change in which the input $I_1$ of the microcomputer control unit 60 is changed from a 'high' state to a 'low' state, determines that the power is to be turned off, and outputs the output $O_1$ as a low.

At this time, since the transistor Q2 is turned off and the current flowing to the relay K1 is cut off, the coil is de-energized, and the contact points K1a/K1b and K1c/K1d are disconnected. Therefore, all pieces of the AC power supplied to the power unit 60 are cut off and thus a standby electric power can be completely cut off.

Figure 2:
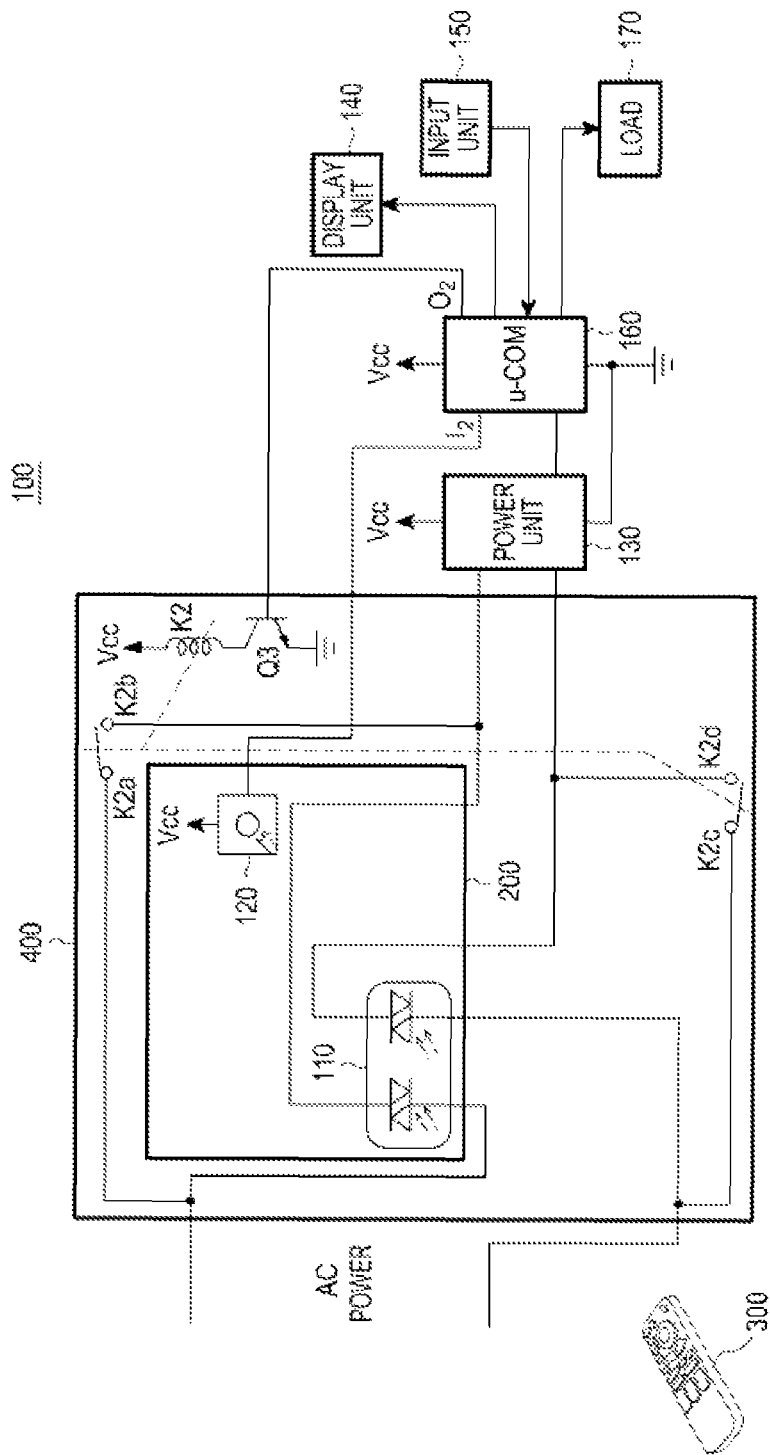
FIG. 2 illustrates a circuit diagram of an example of a standby electric power cutoff apparatus of an electronic product controlled by an IR remote controller according to another embodiment of the present invention.

FIG. 2 illustrates a circuit diagram of an example of a standby electric power cutoff apparatus of an electronic product controlled by an IR remote controller according to another embodiment of the present invention. Referring to FIG. 2, an electronic product controlled by a remote controller 300 or a part 100 thereof includes a power supply/cutoff unit 400. The power supply/cutoff unit 400 includes an IR receiving triac 110 and an IR receiving module 200. The IR receiving triac 110 receives an IR signal, and when the IR signal is received, the IR receiving triac 110 turns on to supply an AC power to a power unit 130. The IR receiving module 200 is an IR receiving unit 120 which is connected to receive the IR signal and transfer the IR signal to a microcomputer control unit 160.

The power supply/cutoff unit 400 is formed so that the power unit 130 generates and supplies a power necessary for the electronic product 100 and supplies an operation power to the microcomputer control unit 160, when the IR receiving triac 110 turns on and the AC power is supplied to the power unit 130. When the operation power is supplied, the microcomputer turns on a transistor Q3 through an output $O_2$. Therefore, a relay K2 is energized, contact points K2a/K2b and K2c/K2d of the relay are connected, and thus the AC power is continuously supplied to the power unit 130.

Meanwhile, the power supply/cutoff unit 400 is formed so that when a function of a power 'off' of the electronic product is selected using the IR remote controller 300, the IR receiving unit 120 senses a corresponding IR signal and inputs the IR signal to an input $I_2$ of the microcomputer 160. When the power 'off' signal is input, the microcomputer turns off the transistor Q3 through the output $O_2$ to cut off a power to the relay K2. The contact points K2a/K2b and K2c/K2d are disconnected, and thus the supply of the AC power is cut off.

Here, the power unit 130 which generates and supplies the operation power necessary in an operation of the electronic product from the AC power, the microcomputer control unit 160 which performs general functions of sensing a satisfaction-or-not of a state of the electronic product and control conditions, an operation, an analysis and a control, the display unit 140 which display information according to the operation of the electronic product to an outside thereof, an input unit 150 which inputs data to the electronic product and corrects the data, and a load 170 according to the operation of the electronic product are common elements which are normally included or commonly included in an electronic product, have the same or performs similar functions those of the elements shown in FIG. 1, and detailed descriptions about these elements will be omitted here for convenience.

Figure 3:
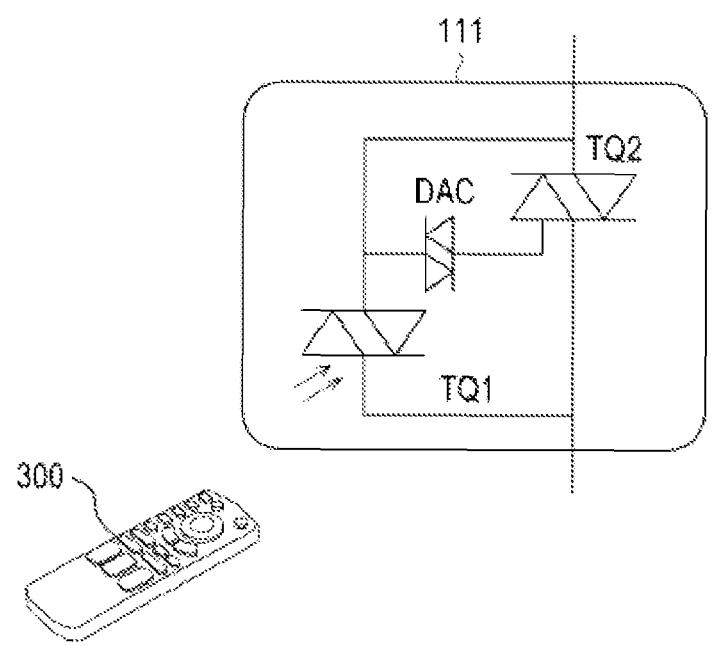
FIG. 3 is a view illustrating an embodiment of an IR receiving triac having a pre-amplifying terminal so that an IR receiving module of the present invention is operated by a small IR signal.

FIG. 3 is a view illustrating an embodiment of an IR receiving triac 110 having a pre-amplifying terminal so that an IR receiving module 200 performs a good operation even for an IR signal having a small level when a standby electric power cutoff apparatus of an electronic product controlled by an IR remote controller according to an embodiment of the present invention is operated. The IR receiving triac includes a photo-triac TQ1 which is operated even by a weak signal when an IR signal is input weakly through a lens, as a pre-amp terminal, and an IR receiving triac increasing an amplification ratio so that when the photo-triac TQ1 is turned on, a following diac is oscillated, and a main triac is turned on, as shown in FIG. 3.

Hereinafter, in the case of the electronic product 100, an operation principle is described in detail with reference to FIG. 2. In a state in which a power is cut off in the electronic product 100, a power 'on' signal is transmitted from the remote controller 300 and received by the IR receiving triac 110 of the IR receiving module 200, the triac is turned on only while the power 'on' signal is received, and thus the AC power is supplied to the power unit 130.

When the power is supplied to the power unit 130, the power unit 130 generates and supplies a power necessary for the electronic product. When a power voltage is supplied from the power unit 130 to the microcomputer control unit 160, the microcomputer is operated, the output $O_2$ is a 'high' state, the transistor Q3 of the power supply/cutoff unit 400 is turned on, a current flows to a coil of the relay K2, the relay becomes an energized state, the contact points K2a/K2b and K2c/K2d are connected, and the AC power is continuously supplied to the power unit 130 without a signal of the remote controller 300, and thus the electronic product 100 is normally operated.

At this time, once a power is supplied to the electronic product, a DC voltage is supplied to the IR receiving unit 120 of the power supply/cutoff unit 300, and thus common function controls such as channel and volume controls are possible using the remote controller 300.

Meanwhile, when the power is turned off using the remote controller 300 in order to turn off the power, the IR receiving unit 120 transfers this signal to the input $I_2$ of the microcomputer 160. At this time, the microcomputer 160 determines this signal, when this signal is a power 'off' signal, the microcomputer 160 outputs a 'low' state through the output $O_2$ thereof, turns off the transistor Q3 of the power supply/cutoff unit 300, and cuts off the current flowed to the coil, the coil is de-energized, the contact points K2a/K2b and K2c/K2d of the relay are disconnected, and thus the supply of the AC power for the power unit 130 is completely cut off.

Therefore, by completely cutting off the supply of the AC power for the power unit 130, the supply of the power is completely cut off to the electronic product 100 controlled using the IR remote controller, and thus it is understood that a standby electric power is zero.

Meanwhile, FIG. 3 illustrates another embodiment of the IR receiving triac 110 of which an amplification ratio is increased so as to be operated even when the IR signal is weakly received from the remote controller 300. As shown, a triac TQ1 operated by a low current is formed as a pre-amp terminal. It is formed so that a diac is oscillated, a main triac TQ2 is turned on, and thus a large current flows when the triac TQ1 of the pre-amp terminal is turned on.

Meanwhile, a control method in a case in which the power is turned on in the electronic product using the IR remote controller is as follows. When a power is turned on using the remote controller in a state in which a power is completely cut off in the electronic product 100, in order to prevent an incorrect operation due to an external disturbance, when a predetermined signal is carried on a carrier frequency of the remote controller and is transmitted, the IR receiving triac 110 is turned on, the AC power is supplied to the power unit 130, and the power unit 130 generates and supplies the power to the electronic product. At this time, the power is applied to even the IR receiving unit 120, the IR receiving unit 120 receives a control signal carried on a carrier signal to provide the control signal to the microcomputer control unit 160, the microcomputer analyzes the control signal, only when the control signal is determined as a predetermined normal signal, and the microcomputer controls to operate the relay K2 of the power supply/cutoff unit 400, the AC power is supplied to the power unit 130, and thus the microcomputer may prevent the incorrect operation of the IR remote controller due to the disturbance.

As described above, the standby electric power cutoff apparatus and the control method thereof according to the present invention are shown and described with reference to random example embodiments, however, common experts of a related technical field will understand that forms and details thereof may be variously modified without departing from a spirit and a scope of the present invention as defined by a scope of the accompanying claims and equivalents thereof.

The invention claimed is:

1. A standby electric power cutoff apparatus of an electronic product (10), comprising:
    a power unit (30) that generates and supplies operation power necessary in an operation of the electronic product from an AC supply power;
    a control unit (60) including a microcomputer (u-COM) performing general functions of a monitoring of a satisfaction-or-not of an operation state of the electronic product and predetermined control conditions, an operation, an analysis and a control; and
    a power supply/cutoff unit (20) that receives the AC supply power and supplies or cuts off the AC supply power to the power unit (30) of the electronic product under a control of the control unit (60),
    wherein the power supply/cutoff unit (20) comprises:
    a power switch (SW) that manually turns an AC power of the electronic product on/off;

a pair of photo-triacs (21, 22) that pass through the power switch (SW) between input terminals of the AC power and are disposed in parallel, wherein each photo-triac (21 or 22) includes at least one light emitting diode (D2 or D4) of which one terminal is connected from the power switch (SW) to a triac (T1/T2 or T3/T4) so that the photo-triac operates by receiving a light emitting signal from the diode;

a photo-coupler (23) disposed between the power switch (SW) and one side input terminals of the AC power, and including at least one light emitting diode (D3) and a transistor (Q1) that is formed to receive a light emitting signal from the light emitting diode; and a relay means that includes a relay (K1) connected to the control unit (60), and supplies or cuts off the AC supply power to the power unit (30) by driving the relay (K1) according to a control state of the control unit (60) to connect or disconnect contact points (K1a/K1b and K1c/K1d) of the relay, wherein, when the power switch (SW) is turned on, the AC power is supplied to the power unit (30) via the pair of photo-triacs (21, 22), and when the power switch (SW) is turned off, a predetermined control signal corresponding to a state of the turned off is supplied to the control unit (60) from the photo-coupler (23);

wherein, when the operation power is supplied to the control unit (60), the control unit controls the relay means to supply the AC supply power to the power unit (30), and when the predetermined control signal corresponding to a state of the turned off is supplied to the control unit (60), the control unit controls the relay means to cut off the Ac supply power to the power unit (30).

2. The standby electric power cutoff apparatus as claimed in claim 1, wherein the microcomputer (u-COM) of the control unit (60) is a microprocessor.

3. The standby electric power cutoff apparatus as claimed in claim 1, wherein a current limiting resistor (R1) serially connected between an input terminal of the AC supply power and the photo-triacs (21, 22) and a diode (D1) are included.

4. The standby electric power cutoff apparatus as claimed in claim 3, wherein the relay means includes a transistor (Q2) of which a base is connected to an output terminal ($O_1$) of the control unit (60) and a relay (K1) directly connected to the transistor (Q2), drives the relay (K1) to an energized/de-energized state under a control of the microcomputer to drive the contact points (K1a/K1b and K1c/K1d) to the connected or the disconnected state.

5. The standby electric power cutoff apparatus as claimed in claim 3, wherein the power switch (SW) includes at least one tact switch.

6. The standby electric power cutoff apparatus as claimed in claim 3, wherein a collector terminal of the transistor (Q1) of the photo-coupler (23) is connected to an input terminal ($I_1$) of the control unit (60) to supply the predetermined control signal to the input terminal ($I_1$) of the control unit (60) according to a lit state of the light emitting diode (D3) of the photo-coupler (23).

7. A standby electric power cutoff apparatus of an electronic product (100) controlled by a remote control (300), comprising:

a power unit (130) that generates and supplies operation power necessary in an operation of the electronic product from an AC supply power;

a control unit (160) including a microcomputer (u-COM) performing general functions of a monitoring of a satisfaction-or-not of an operation state of the electronic product and predetermined control conditions, an operation, an analysis and a control; and a power supply/cutoff unit (400) that receives the AC supply power and supplies or cuts off the AC supply power to the power unit (130) of the electronic product under a control of the control unit (160), wherein the power supply/cutoff unit (400) comprises:

an IR receiving power switching unit (110) that receives an IR signal from the remote control, and when the IR signal is received, turns only using the received IR signal on to transfer the AC supply power to the power unit (130); and an IR receiving unit (120) that receives the IR signal and transfers the IR signal to the control unit (160) as a control signal, wherein, when the operation power is supplied to the control unit (60), the control unit controls the power supply/cutoff unit (400) to supply the AC supply power to the power unit (30), and when the control signal according to turned off is transferred to the control unit (60) from the IR receiving unit, the control unit controls the power supply/cutoff unit (400) to cut off the Ac supply power to the power unit (30).

8. The standby electric power cutoff apparatus as claimed in claim 7, wherein, the power supply/cutoff unit (400) further comprises a relay means that includes at least one relay (K2) connected to an output ($O_2$) of the control unit (160), and supplies or cuts off the AC supply power to the power unit (130) by driving the relay (K2) according to a control state of the control unit (160) to connect or disconnect contact points (K2a/K2b and K2c/K2d) of the relay, wherein the power supply/cutoff unit (400) is formed so that the AC power is supplied to the power unit (130), when the IR receiving triac (110) is turned on and the AC power is supplied to the power unit (130), the power unit (130) generates and supplies a power necessary for the electronic product (100) to supply the operation power to the control unit (160), when the operation power is supplied, and the control unit (160) sets the relay (K2) to an energized state through an output ($O_2$) to connect the contact points (K2a/K2b and K2c/K2d) of the relay (K2) so that the AC power is supplied to the power unit (130).

9. The standby electric power cutoff apparatus as claimed in claim 8, wherein the microcomputer (u-COM) of the control unit (160) is a microprocessor.

10. The standby electric power cutoff apparatus as claimed in claim 8, wherein the relay means includes a transistor (Q3) of which a base is connected to an output terminal ($O_2$) of the control unit (160) and a relay (K2) directly connected to the transistor (Q3), and drives the relay (K2) to an energized/de-energized state under a control of an output signal of control unit (160) to drive the contact points (K2a/K2b and K2c/K2d) to the connection or the disconnection state.

11. The standby electric power cutoff apparatus as claimed in claim 8, wherein the IR receiving triac (110) is formed with a pre-amp terminal including at least one triac (TQ1) operated by a low current, and is formed so that when the triac (TQ1) is turned on, a next connected diac oscillates, and a main triac (TQ2) is turned on to flow a large current.

* * * * *